UNITED STATES PATENT OFFICE.

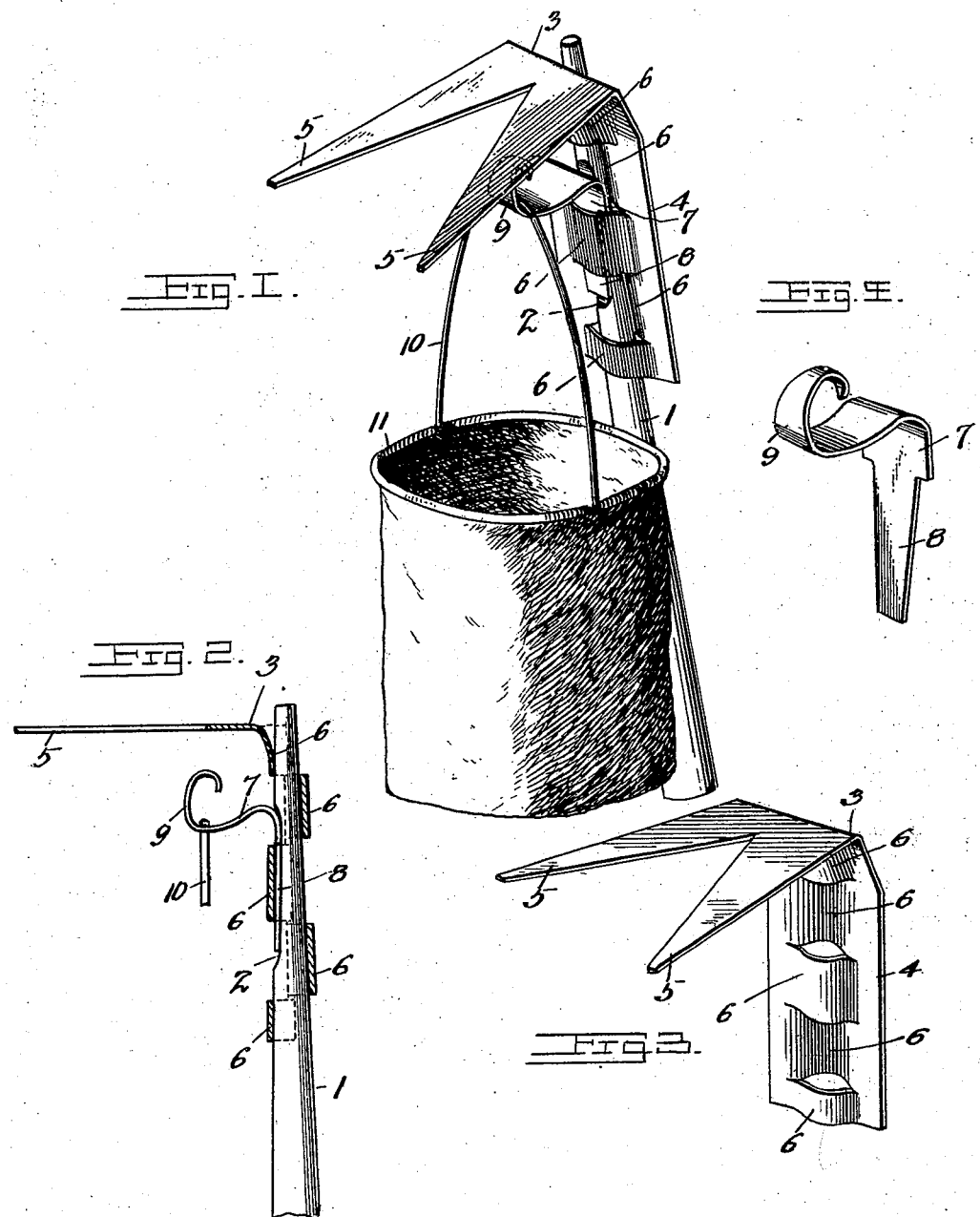

HEZEKIAH ELLSWORTH, OF ALBUQUERQUE, TERRITORY OF NEW MEXICO.

FRUIT-PICKER.

SPECIFICATION forming part of Letters Patent No. 692,838, dated February 11, 1902.

Application filed June 18, 1901. Serial No. 65,054. (No model.)

*To all whom it may concern:*

Be it known that I, HEZEKIAH ELLSWORTH, a citizen of the United States, residing at Albuquerque, in the county of Bernalillo and Territory of New Mexico, have invented a new and useful Fruit-Picker, of which the following is a specification.

This invention relates to fruit-pickers, and has for its object to provide an improved implement of this character which is arranged for conveniently pulling the fruit from the trees without the aid of a ladder and also designed to collect the fruit as it is picked, so as to prevent the same from falling to the ground, and thereby becoming bruised and damaged.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a fruit-picker constructed in accordance with the present invention. Fig. 2 is a longitudinal sectional view thereof. Fig. 3 is a detail perspective view of the picker member. Fig. 4 is a detail perspective view of the device for holding the fruit-collecting receptacle and for securing the picker member to the handle of the implement.

Like characters of reference designate corresponding parts in all of the figures of the drawings.

Referring to the drawings, 1 designates a wooden handle of suitable length which is tapered at its upper end and is also provided with a notched or flattened portion 2 upon the tapered end. Upon the tapered end of the handle there is fitted the picker member 3, which is formed by an angular metallic plate, of which the part 4 forms a shank for connection with the handle, and the opposite part is provided with a substantially V-shaped slot, extending for nearly the entire length thereof to form the jaws or forks 5, which project at substantially right angles to the handle. The shank portion is provided with a plurality of transverse incisions, and between the incisions the metal is bent laterally outward to form alternate loops 6, thereby producing a longitudinal socket for the reception of the tapered end of the handle.

To rigidly connect the shank to the handle, there is provided a holder 7, formed from a single piece of metal and formed into a tapered flat shank 8, which is driven longitudinally inward between the handle and that loop 6 which embraces the flattened portion of the handle, thereby wedging the picker member firmly upon the handle and permitting of the removal of the picker member by the withdrawal of the holder. The upper portion of the holder is bent laterally outward into a hook 9, upon which is hung the bail-handle 10 of a suitable receptacle 11 for containing the fruit as it is picked from the tree.

In using the device the jaws of the picker are placed astraddle of the stem of the fruit to be picked and then the implement is given a quick downward pull, thereby pulling the fruit from the tree, the receptacle being located below the picker, so as to catch the fruit as it falls from the tree, thereby obviating injury to the picked fruit. When the receptacle has become filled with fruit, it may be conveniently removed from the hook to be emptied and then replaced for the further collection of fruit.

What is claimed is—

1. A fruit-picker, comprising a handle, a picker member having jaws extended laterally with respect to the handle, and a socket applied to the handle, and a socket-holder driven longitudinally inward between the handle and the socket, one end of the holder being projected beyond the socket and provided with a hook projected laterally from the handle and formed for the support of a receptacle.

2. A fruit-picker, comprising a handle, a picker member formed by an angular metallic body, one part of which is provided with lateral incisions with the metal bent laterally outward in opposite directions into alternately-disposed loops forming a socket for the reception of the handle, and the other part being bifurcated to form opposite jaws, a holding device driven inwardly between one of the loops and the handle, and having its upper end formed into a laterally-projected hook, and a receptacle detachably hung from the hook.

In testimony that I claim the foregoing as my own I have hereto affixed my signature in the presence of two witnesses.

HEZEKIAH ELLSWORTH.

Witnesses:
GREEN WATSON,
N. I. ROBINSON.